(12) United States Patent
Borbe et al.

(10) Patent No.: US 6,915,998 B2
(45) Date of Patent: Jul. 12, 2005

(54) LONGITUDINAL ADJUSTER FOR A VEHICLE SEAT

(75) Inventors: Michael Borbe, Rheinbach (DE); Stefan Wetzig, Ennepetal (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/839,597

(22) Filed: May 5, 2004

(65) Prior Publication Data

US 2004/0206878 A1 Oct. 21, 2004

Related U.S. Application Data

(63) Continuation of application No. PCT/EP03/06609, filed on Jun. 24, 2003.

(30) Foreign Application Priority Data

Jul. 6, 2002 (DE) .......................................... 102 30 514

(51) Int. Cl.[7] ................................................ B60N 2/12
(52) U.S. Cl. ................ 248/429; 297/362.14; 296/65.15
(58) Field of Search ................................ 248/424, 429, 248/298.1; 74/425; 297/362.14; 296/65.15, 65.13, 65.12

(56) References Cited

U.S. PATENT DOCUMENTS

| 4,802,374 | A | | 2/1989 | Hamelin et al. |
| 4,907,776 | A | * | 3/1990 | Nemoto ...................... 248/430 |
| 5,259,257 | A | | 11/1993 | Mouri |
| 5,314,158 | A | * | 5/1994 | Mouri ........................ 248/429 |
| 5,447,352 | A | * | 9/1995 | Ito et al. ................... 296/65.14 |
| 5,487,520 | A | * | 1/1996 | Mouri et al. ................. 248/429 |
| 5,746,409 | A | * | 5/1998 | Rees ........................... 248/422 |
| 5,797,293 | A | | 8/1998 | Chaban |
| 5,816,555 | A | * | 10/1998 | Ito et al. ...................... 248/429 |
| 5,848,775 | A | * | 12/1998 | Isomura et al. ............. 248/430 |
| 6,138,974 | A | | 10/2000 | Okada et al. |
| 6,220,642 | B1 | * | 4/2001 | Ito et al. ................... 296/65.14 |
| 6,244,660 | B1 | | 6/2001 | Yoshimatsu |
| 6,499,712 | B1 | * | 12/2002 | Clark et al. ................. 248/429 |
| 6,688,667 | B2 | * | 2/2004 | Nishimoto et al. ...... 296/65.15 |

FOREIGN PATENT DOCUMENTS

| DE | 1 755 740 | 1/1972 |
| DE | 198 15 283 C2 | 10/1999 |
| DE | 101 39 631 A1 | 3/2003 |
| EP | 1 010 571 A2 | 6/2000 |

* cited by examiner

*Primary Examiner*—Jonathon Szumny
(74) *Attorney, Agent, or Firm*—Womble Carlyle Sandridge & Rice, PLLC

(57) ABSTRACT

In a longitudinal adjuster for a vehicle seat, in particular for an automobile seat, for motor-driven longitudinal adjustment of the vehicle seat (1), having a first seat rail (5) defining the longitudinal direction, a second seat rail (8) that can be made to slide relative to the first seat rail (5), a first drive element (11) in the first seat rail (5), and a second drive element (14) cooperating with the first drive element (11) to achieve longitudinal adjustment, the second drive element (14) being mounted in a drive casing (18) belonging to the second seat rail (8), the drive casing (18) being mounted longitudinally between two bearing plates (20) connected to the second seat rail (8), and each bearing plate (20) is firmly attached to the second seat rail (8) on at least two sides.

19 Claims, 2 Drawing Sheets

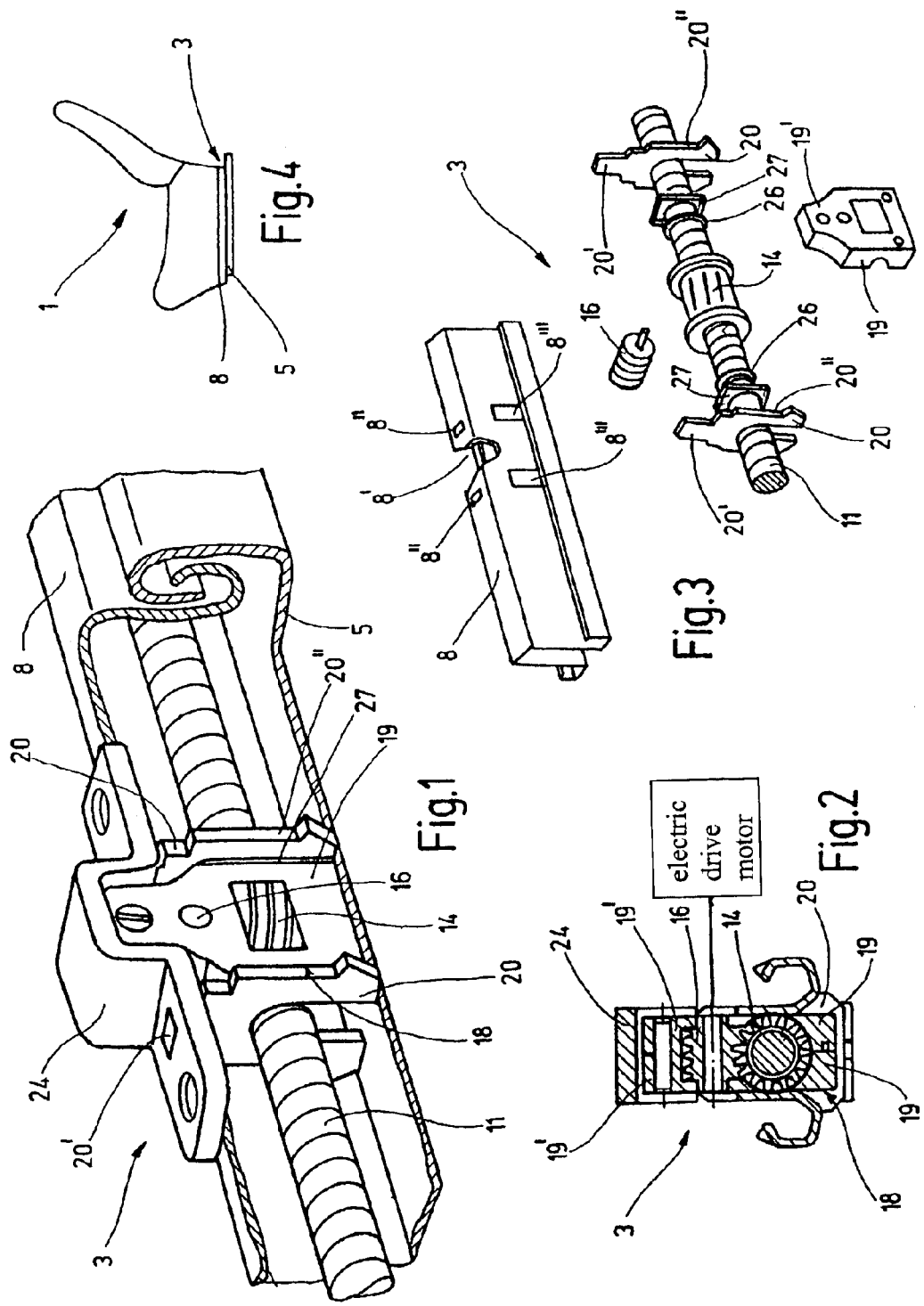

LONGITUDINAL ADJUSTER FOR A VEHICLE SEAT

CROSS-REFERENCE TO RELATED APPLICATION

This is a continuation of PCT/EP03/06609, which was filed Jun. 24, 2003, designates the U.S., and is incorporated herein by reference.

BACKGROUND OF THE INVENTION

The present invention pertains to a longitudinal adjuster for a vehicle seat, in particular for an automobile seat, with the longitudinal adjuster providing motor-driven longitudinal adjustment of the vehicle seat and having a first seat rail defining the longitudinal direction, a second seat rail that can slide relative to the first seat rail, a first drive element in the first seat rail, and a second drive element cooperating with the first drive element to achieve longitudinal adjustment, with the second drive element being mounted in a drive casing belonging to the second seat rail, and the drive casing being mounted longitudinally between two bearing plates or bearing plate sections connected to the second seat rail.

DE 198 15 283 C2 discloses a longitudinal adjuster of the type described in the immediately preceding paragraph, in which the drive is located in a drive casing that is held in place by a mounting clamp having a horizontal bottom section and two vertical bearing plate sections in front of and behind the drive casing. The mounting clamp is attached to the upper rail by screwing it on the upper rail in longitudinal direction in front of and behind the casing.

BRIEF SUMMARY OF SOME ASPECTS OF THE INVENTION

The present invention is based on the object of improving a longitudinal adjuster of the type mentioned above. According to one aspect of the present invention, this object is achieved through a longitudinal adjuster for a vehicle seat, in particular for an automobile seat, with the longitudinal adjuster providing motor-driven longitudinal adjustment of the vehicle seat and having a first seat rail defining the longitudinal direction, a second seat rail that can slide relative to the first seat rail, a first drive element in the first seat rail, and a second drive element cooperating with the first drive element to achieve longitudinal adjustment, with the second drive element being mounted in a drive casing belonging to the second seat rail, the drive casing being mounted longitudinally between two bearing plates connected to the second seat rail, and each bearing plate being firmly attached to the second seat rail on at least two sides. Each of the bearing plates can be a bearing plate section.

Because all bearing plates or bearing plate areas, which are generally arranged in a vertical direction, are firmly attached to the second seat rail on at least two sides, in particular on the two vertical sides and preferably on three sides in all, the longitudinal adjuster is able to absorb large drive forces and crash loads. Individual bearing plates or functionally equivalent bearing plate sections of an integral unit, for example a mounting clamp, may be used. The bearing plates or bearing plate sections can be inserted into the second seat rail using light press shoring construction (calibrated to a given value), with this procedure producing a three-sided contour lock (e.g., an interference fit). Then the bearing plates or bearing plate sections are firmly attached to said rail. Options for firm attachment are rivets or material bonding, in particular through welding. High load absorption together with optimum rigidity is preferably achieved by a contour lock arrangement (e.g., an interference fit) between openings in the seat rail and suitable material parts in the bearing plates or bearing plate sections; the openings may also serve to ensure greater accessibility of the bearing plates or bearing plate sections during the process of material bonding. The contour lock may be in a longitudinal and/or in a vertical direction. By bridging the openings in the seat rail by means of bonding or a lid/cover, weakening of the seat rail is avoided. The distance between the bearing plates or bearing plate sections can be set by means of a calibration device, with the openings in the seat rail also allowing a corresponding calibration. The firm attachment of the seat rail and the bearing plates or bearing plate sections is done using the set distance.

The drive casing allows the distance between the axles of the drive elements to be better maintained, this arrangement reducing noise, wear and tear. In order to specifically reduce longitudinal play and resonance in all directions, absorber elements are preferably located between the drive casing and the bearing plates. In a preferred embodiment able to absorb high drive forces, a stationary gear spindle and a wormwheel turning on the gear spindle are mounted as drive elements.

BRIEF DESCRIPTION OF THE DRAWINGS

The invention is explained in greater detail below with reference to two exemplary embodiments illustrated in the drawing, in which:

FIG. 1 is a perspective, partially sectional partial view of the first exemplary embodiment, FIG. 2 is a cross section through the first exemplary embodiment in the area of the upper rail, FIG. 3 is an exploded view of some parts of the first exemplary embodiment, FIG. 4 is a schematic view of a vehicle seat.

DETAILED DESCRIPTION OF THE INVENTION

Figure 5:
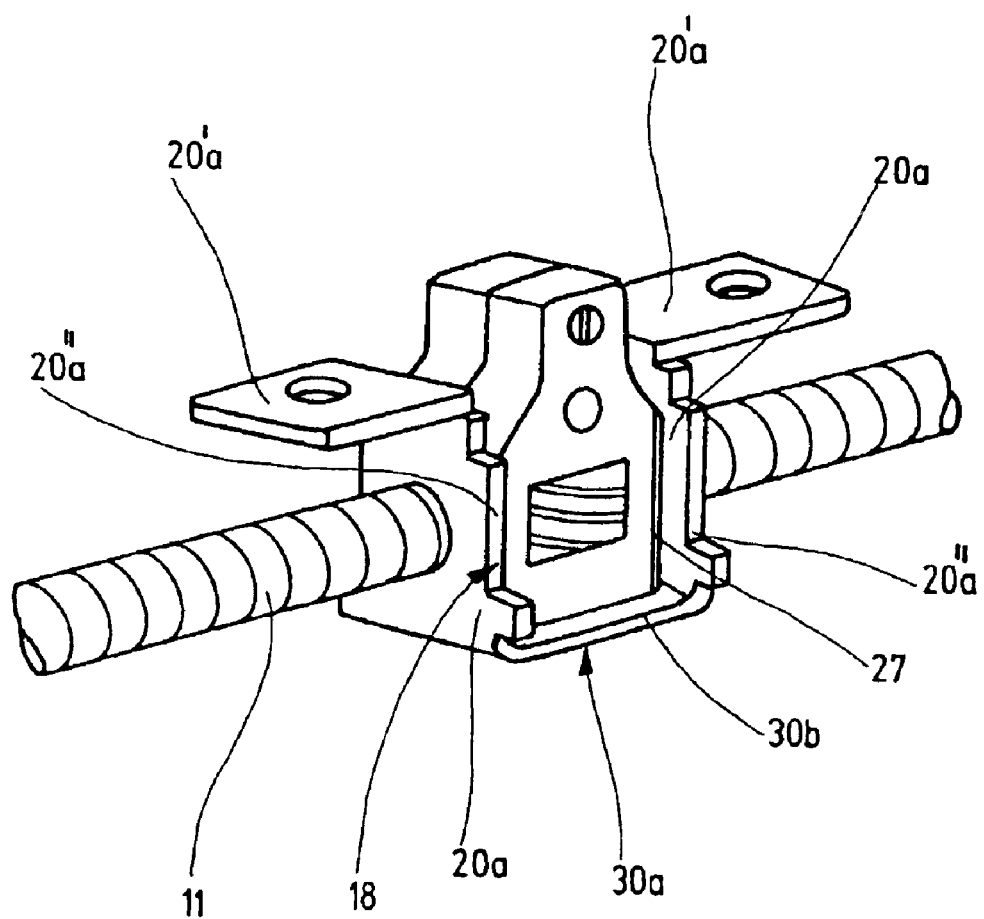
FIG. 5 is a perspective partial view of the second exemplary embodiment.

A motor-driven longitudinally adjustable vehicle seat 1 is equipped With a longitudinal adjusting device, and the longitudinal adjusting device is hereinafter referred to as longitudinal adjuster 3. On each side of the vehicle seat 1 the longitudinal adjuster 3 comprises a pair of seat rails consisting of a lower rail 5, which is mounted to the vehicle structure and functions as a guiding rail, and an upper rail 8, which is mounted to the seat structure and functions as running rail that runs in the lower rail 5. The lower rail 5 and upper rail 8 both generally have a U-shape. The lower rail 5 and upper rail 8 fit into each other with their inward and/or outward bent marginal areas, thereby forming a closed rail profile. The seat rails also define the following directional references.

The longitudinal adjuster 3 also comprises a gear spindle 11 firmly attached to the lower rail 5 and extending parallel to the lower rail 5 inside the construction space defined by the rail profile. Similar to a spindle nut a wormwheel 14 is screwed with its inner thread onto the outer thread of the gear spindle 11. In a middle longitudinal position of the vehicle seat 1, the wormwheel 14 is in the middle of the lower rail 5. On its outer side the wormwheel 14 bears oblique teeth which mesh with a drive worm 16 positioned above the wormwheel. The drive worm 16 is connected to an electric drive of the longitudinal adjuster 3.

A drive casing 18 bears the above-described drive elements and maximally fills the mounting space defined by the rail profile, i.e. is generally arranged inside the upper rail 8, so as to function as a load-bearing casing with optimum rigidity. The drive casing 18 consists of two lateral casing components 19 that touch in some areas and are screwed to one another. The two lateral casing components 19 provide the bearing for the drive worm 16 that is arranged transverse to the longitudinal direction of the upper rail 8. Each lateral casing component 19 has a window for the wormwheel 14, so that its dimension is not limited to the clear width of the drive casing 18. By means of ledges 19', the lateral casing components 19 protrude through a pre-slotted first opening 8' in the upper rail 8.

In the first exemplary embodiment, flat bearing plates 20, whose outer contours closely fit the rail profile, are vertically arranged both in front of and behind the drive casing 18. Each bearing plate 20 has a downward-directed vertical slot into which the gear spindle 11 is inserted. On the upward-facing side of each bearing plate 20, there is an upwardly extending tab 20'. The tabs 20' respectively closely fit, extend through, and protrude from pre-slotted second openings 8" in the upper rail 8 (e.g., to provide an interference fit). Lateral marginal areas 20" in each bearing plate 20 respectively closely fit the contours of the lateral third openings 8''' in the upper rail 8, and reach through the openings 8''' (e.g., to provide an interference fit). The bearing plates 20 are additionally bonded to the upper rail 8, for example by laser welding in the area of the tabs 20' and the marginal areas 20".

A lid 24 or metal cover is placed over the upper rail 8 in the area of the first opening 8' and second openings 8". The lid 24 is contour locked and is bonded to the bearing plates by inserting the free endings of the tabs 20' into corresponding receiver slots in the lid 24 providing closely-fitting connection in the longitudinal direction of the upper rail 8, so that the lid 24 is also bonded when the tabs 20' are welded. The ledges 19' in the drive casing 18 are preferably completely covered by the lid 24.

The drive casing 18 is generally arranged in such a way that there is some play between the bearing plates 20; i.e. it can move to a limited extent. However, there is an absorbing element 27 (FIGS. 1 and 3) between the drive casing 18 and the bearing plates 20 that is pushed over the gear spindle 11, with a bearing bush 26 (FIG. 3) inserted between each element. The edge of the absorbing element 27 extends over part of the drive casing 18, including the bearing bush 26. The absorbing element 27 is made of absorbing material and thus reduces play and resonance both in a longitudinal and transversal direction, i.e. in all directions. During assembly, the gear spindle 11 is first pre-assembled together with the drive casing 18 including the drive, absorbing elements 27 and pertaining components, and is then inserted from below into the previously painted upper rail 8 together with the bearing plates 20.

For longitudinal adjustment, the drive motor drives the wormwheel 14 via the drive worm 16 which moves over the stationary gear spindle 11, thereby, by exercising pressure on the bearing plates 20 via the drive casing 18 and the absorbing elements 27, carrying the upper rail 8 with it. Even when the seat rails 5 and 8 are longitudinally statically locked, the bearing plates 20 absorb the forces acting via the drive casing.

The second exemplary embodiment, unless hereinafter described otherwise, is identical to the first exemplary embodiment. For this reason, identical components have identical reference signs, and components having identical functions have reference signs that are followed by small letters.

The drive casing 18 is furthermore arranged inside the rail profile, but is taken up in a monolithic mounting clamp 30*a* having two elbows. At its center, the mounting clamp 30*a* has a horizontal bottom section 30*b* that is arranged below the drive casing 18. Adjacent to the bottom section 30*b* in a longitudinal direction, there is a vertically mounted bearing plate section 20*a* both in front of and behind the drive casing 18; this extends vertically upward from the bottom section 30*b* and, in its outer contours, closely fits the rail profile. Connected to each vertical bearing plate section 20*a* is a horizontal tab 20*a*' as a terminal section, the tab being bonded to the side of the upper end of the bearing plate section 20*a* that faces away from the drive casing 18. Both tabs 20*a*' have, for example, screw receivers for attachment to the upper rail 8 and/or the lid 24.

The bearing plate sections 20*a* allow the increased load absorption intended by the invention, i.e. the lateral marginal areas 20*a*" protrude through lateral third openings 8''' in the upper rail 8 and are bonded to the upper rail 8. The only difference from the first exemplary embodiment is that the two bearing plate sections 20*a* are bonded to form one piece.

That which is claimed:

1. A longitudinal adjuster for providing motor-driven longitudinal adjustment of a vehicle seat, the longitudinal adjuster comprising:
   a first seat rail extending in a longitudinal direction;
   a second seat rail mounted:
      for sliding relative to the first seat rail in the longitudinal direction, and
      so that a space is defined between the first seat rail and the second seat rail;
   a stationary spindle firmly attached to the first seat rail, wherein the spindle is positioned in the space defined between the first seat rail and the second seat rail;
   a drive element mounted in a drive casing for cooperating with the spindle to cause the second seat rail to slide relative to the first seat rail in the longitudinal direction; and
   two bearing plates which are spaced apart from one another in the longitudinal direction, wherein:
      for each of the bearing plates:
         there is firm attachment between the bearing plate and the second seat rail proximate at least two sides of the bearing plate so that the bearing plate moves with the second seat rail relative to the first seat rail in the longitudinal direction, and
         the firm attachment includes at least:
            a first engagement between the bearing plate and the second seat rail, with the first engagement being proximate a first of the two sides of the bearing plate, and
            a second engagement between the bearing plate and the second seat rail, with the second engagement being proximate a second of the two sides of the bearing plate,
      the drive casing is mounted between the two bearing plates so that the drive casing moves with the second seat rail relative to the first seat rail in the longitudinal direction, and
      the second seat rail includes a plurality of openings which are each discontinuous from one another and are respectively proximate to substantial parts of the bearing plates.

2. The longitudinal adjuster according to claim 1, wherein for each of the bearing plates, the firm attachment further includes a third engagement between the bearing plate and the second seat rail, with the third engagement being proximate a third side of the bearing plate.

3. The longitudinal adjuster according to claim 1, wherein for each of the bearing plates, each of the first engagement and the second engagement comprises an engagement selected from the group consisting of:
   an interference fit between the bearing plate and the second seat rail, and
   a bond between the bearing plate and the second seat rail.

4. The longitudinal adjuster according to claim 1, wherein for each of the bearing plates, each of the first engagement and the second engagement comprises a bond between the bearing plate and the second seat rail, and the bond is formed by laser welding.

5. The longitudinal adjuster according to claim 1, wherein the plurality of openings of the second seat rail are sized and arranged for respectively providing access to the substantial parts of the bearing plates.

6. The longitudinal adjuster according to claim 5, wherein
   the substantial parts of the bearing plates include:
      a first part of a first bearing plate of the bearing plates,
      a second part of the first bearing plate,
      a first part of a second bearing plate of the bearing plates, and a second part of the second bearing plate; and
   the plurality of openings of the second seat rail includes:
      a first opening which is proximate the first part of the first bearing plate,
      a second opening which is proximate the second part of the first bearing plate,
      a third opening which is proximate the first part of the second bearing plate, and
      a fourth opening which is proximate the second part of the second bearing plate.

7. The longitudinal adjuster according to claim 1, wherein each of the bearing plates is a bearing plate section, and the bearing plate sections are part of a monolithic mounting clamp.

8. The longitudinal adjuster according to claim 1, further comprising:
   a first impact absorber positioned between the drive casing and a first bearing plate of the bearing plates, and
   a second impact absorber positioned between the drive casing and a second bearing plate of the bearing plates.

9. The longitudinal adjuster according to claim 1, wherein:
   the spindle is a gear spindle, and
   the drive element is a rotating wormwheel that is screwed onto the gear spindle and driven by a drive motor via a drive worm.

10. The longitudinal adjuster according to claim 1, wherein the longitudinal adjuster is in combination with the vehicle seat so that the vehicle seat is longitudinally adjustable.

11. The longitudinal adjuster according to claim 1, wherein for each of the bearing plates, each of the first engagement and the second engagement comprises an interference fit between the bearing plate and the second seat rail.

12. The longitudinal adjuster according to claim 1, wherein:
   for each of the bearing plates, each of the first engagement and the second engagement comprises an interference fit between the bearing plate and the second seat rail, and
   the interference fits between the bearing plates and the second seat rail comprise the plurality of openings of the second seat rail respectively being in receipt of the substantial parts of the bearing plates.

13. The longitudinal adjuster according to claim 12, wherein for each of the bearing plates, each of the first engagement and the second engagement further comprises a bond between the bearing plate and the second seat rail.

14. The longitudinal adjuster according to claim 12, wherein
   the substantial parts of the bearing plates include:
      a first part of a first bearing plate of the bearing plates,
      a second part of the first bearing plate,
      a first part of a second bearing plate of the bearing plates, and
      a second part of the second bearing plate; and
   the plurality of openings of the second seat rail includes:
      a first opening which is in receipt of the first part of the first bearing plate,
      a second opening which is in receipt of the second part of the first bearing plate,
      a third opening which is in receipt of the first part of the second bearing plate, and
      a fourth opening which is in receipt of the second part of the second bearing plate.

15. The longitudinal adjuster according to claim 1, wherein
   the substantial parts of the bearing plates include:
      a first part of a first bearing plate of the bearing plates,
      a second part of the first bearing plate,
      a first part of a second bearing plate of the bearing plates, and
      a second part of the second bearing plate; and
   the plurality of openings of the second seat rail includes:
      a first opening which is proximate the first part of the first bearing plate,
      a second opening which is proximate the second part of the first bearing plate,
      a third opening which is proximate the first part of the second bearing plate, and
   a fourth opening which is proximate the second part of the second bearing plate.

16. A longitudinal adjuster for providing motor-driven longitudinal adjustment of a vehicle seat, the longitudinal adjuster comprising:
   a first seat rail extending in a longitudinal direction;
   a second seat rail mounted:
      for sliding relative to the first seat rail in the longitudinal direction, and
      so that a space is defined between the first seat rail and the second seat rail;
   a first drive element positioned in the space defined between the first seat rail and the second seat rail;
   a second drive element mounted in a drive casing for cooperating with the first drive element to cause the second seat rail to slide relative to the first seat rail in the longitudinal direction; and
   two bearing plates which are spaced apart from one another in the longitudinal direction, wherein:
      for each of the bearing plates there is attachment between the bearing plate and the second seat rail so that the bearing plate moves with the second seat rail relative to the first seat rail in the longitudinal direction,
      the drive casing is mounted between the two bearing plates so that the drive casing moves with the second seat rail relative to the first seat rail in the longitudinal direction, the second seat rail includes a plurality of openings, the attachment includes at least:
- a first interference fit comprising a first opening of the plurality of openings being in receipt of a substantial first part of a first bearing plate of the bearing plates, with the first part being proximate a first side of the first bearing plate,
- a second interference fit comprising a second opening of the plurality of openings being in receipt of a substantial second part of the first bearing plate, with the second part being proximate a second side of the first bearing plate,
- a third interference fit comprising a third opening of the plurality of openings being in receipt of a substantial first part of a second bearing plate of the bearing plates, with the first part of the second bearing plate being proximate a first side of the second bearing plate, and
- a fourth interference fit comprising a fourth opening of the plurality of openings being in receipt of a substantial second part of the second bearing plate, with the second part of the second bearing plate being proximate a second side of the second bearing plate, wherein the first drive element is a stationary gear spindle that is firmly attached to the first seat rail, and the second drive element is a rotating wormwheel that is screwed onto the gear spindle and driven by a drive motor via a drive worm.

17. The longitudinal adjuster according to claim 16 wherein each of the bearing plates is a bearing plate section, and the bearing plate sections are part of a monolithic mounting clamp.

18. The longitudinal adjuster according to claim 16, wherein the first, second, third and fourth openings are each discontiguous from one another, and the attachment further includes:

a first bond proximate the first interference fit, a second bond proximate the second interference fit, a third bond proximate the third interference fit, and a fourth bond proximate the fourth interference fit.

19. The longitudinal adjuster according to claim 16, wherein the longitudinal adjuster is in combination with the vehicle seat so that the vehicle seat is longitudinally adjustable.

* * * * *